United States Patent
Ogawa et al.

(10) Patent No.: US 12,141,239 B2
(45) Date of Patent: Nov. 12, 2024

(54) CLASSIFICATION METHOD OF DATA PATTERN AND CLASSIFICATION SYSTEM OF DATA PATTERN

(71) Applicant: NIPPON TELEGRAPH AND TELEPHONE CORPORATION, Tokyo (JP)

(72) Inventors: Manami Ogawa, Musashino (JP); Masataka Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/918,013

(22) PCT Filed: Apr. 16, 2020

(86) PCT No.: PCT/JP2020/016772
§ 371 (c)(1),
(2) Date: Oct. 10, 2022

(87) PCT Pub. No.: WO2021/210142
PCT Pub. Date: Oct. 21, 2021

(65) Prior Publication Data
US 2023/0259589 A1   Aug. 17, 2023

(51) Int. Cl.
*G06F 7/00* (2006.01)
*G06F 16/00* (2019.01)
*G06F 16/28* (2019.01)
*G06F 18/2431* (2023.01)

(52) U.S. Cl.
CPC ........ *G06F 18/2431* (2023.01); *G06F 16/285* (2019.01)

(58) Field of Classification Search
None
See application file for complete search history.

(56) References Cited

U.S. PATENT DOCUMENTS

| | | | | |
|---|---|---|---|---|
| 2012/0101975 | A1* | 4/2012 | Khosravy | G06Q 30/0201 706/55 |
| 2012/0124037 | A1* | 5/2012 | Lee | G06F 16/432 707/E17.084 |
| 2013/0322743 | A1* | 12/2013 | Matsunaga | G06F 18/285 382/159 |
| 2018/0011830 | A1* | 1/2018 | Iida | G06F 40/268 |
| 2021/0334280 | A1* | 10/2021 | Medvedev | G06F 16/2474 |

FOREIGN PATENT DOCUMENTS

| | | |
|---|---|---|
| JP | 2014219833 A | 11/2014 |
| JP | 2016136341 A | 7/2016 |

* cited by examiner

*Primary Examiner* — Tuan A Pham
(74) *Attorney, Agent, or Firm* — Harness, Dickey & Pierce, P.L.C.

(57) ABSTRACT

To easily find columns containing information to be shared between databases found when the databases (DBs) are combined.
A data-pattern classification method for a database containing character strings regularly overlapping between the input values of mixed columns and information inputted in another specific column, the mixed column including types of information, the method including: extracting means for extracting a branch column for changing the type of information to be inputted to the mixed column, the branch column being extracted by one of a heuristic first technique and a second technique, the first technique using timing to change the pattern of the mixed column in the database including the mixed column, the pattern referring to a column where a character string overlaps the input value of the mixed column, the second technique using a statistical technique of a likelihood test; and classification to obtain the number of types of information stored in the mixed columns, by grouping, according to information indicated by the patterns, the patterns obtained from the mixed columns based on the extracted branch column.

6 Claims, No Drawings

CLASSIFICATION METHOD OF DATA PATTERN AND CLASSIFICATION SYSTEM OF DATA PATTERN

CROSS-REFERENCE TO RELATED APPLICATIONS

This application is a 371 U.S. National Phase of International Application No. PCT/JP2020/016772, filed on Apr. 16, 2020. The entire disclosure of the above application is incorporated herein by reference.

TECHNICAL FIELD

The present invention relates to a data-pattern classification method and a classification system, by which the candidates of precise rules are filtered from information in a database if the type of information inputted in a column of the database is not unified in the column.

BACKGROUND ART

An ordinary database (hereinafter referred to as "DB") contains information about a piece of data, the information being inputted to a dedicated column. In columns such as a remarks column where items to be inputted are not definitely determined, various types of information may be inputted. When a DB including such a remarks column is combined with another DB, information to be shared between the DBs in the remarks column may interfere with proper combination.

Such DBs will be described below using specific examples.

TABLE 1

| ID | School Name | Prefecture | City, town and village | House Number | Telephone Number | Position | Classification | Remarks |
|---|---|---|---|---|---|---|---|---|
| 1 | A University | Tokyo | Minato-ward | 1-11-11 | 5678 | S | Address | 1-11-11, Minato-ward, Tokyo |
| 2 | B High School | Aichi | Nagoya | 2-22 | 6789 | S | Address | 2-22 Nagoya-city |
| 3 | C Technical College | Osaka | Osska | 33-33-3 | 1234 | S | Telephone | 7890-1234 |

Table 1 indicates an example of a DB where character strings regularly overlap in remarks columns. In the remarks columns, one of (1) address and (2) telephone number is inputted. In the case of (1) address, information in columns "prefecture," "city, town and village," and "house number" is shared. However, "prefecture" is not inputted in the remarks column of "ID:2" data. In this way, the expressions of addresses are not unified in the columns.

TABLE 2

| ID | Address | Completion | Area (m²) | Maintenance Company | Remarks |
|---|---|---|---|---|---|
| 1 | 0-0-0, Minato-ward, Tokyo | 2000/1/1 | 1000 | □ □, Inc. | School |
| 2 | x-x, Nagoya-city, Aichi | 1995/1/1 | 1200 | XX maintenance | Prefecture high school |

Table 2 indicates an example of a DB about buildings.

When the DB in table 1 and the DB in table 2 are combined, an address is a common item serving as a trigger. However, table 1 does not have any column corresponding to an address, and part of the data contains telephone numbers, so that a school name or a telephone number in table 1 and building information in table 2 cannot be associated with each other.

To address this problem, a conventional technique is proposed, in which rules are preregistered to determine which one of the rules is abided by an inputted character string (e.g., PTLs 1 and 2).

CITATION LIST

Patent Literatures

[PTL 1] Japanese Patent Application Publication No. 2016-136341
[PTL 2] Japanese Patent Application Publication No. 2014-219833

SUMMARY OF THE INVENTION

Technical Problem

In table 1, types of information (addresses or telephone numbers) are inputted in the remarks columns. An input to each of the remarks columns indicates one type of information. Although address information is inputted in the remarks columns of "ID:1" and "ID:2" in table 1, an address in the remarks column of "ID:1" is inputted from a prefecture name, whereas an address in "ID:2" is inputted from the name of a city, town or village. In this way, the expressions of information are not unified. This is because a human error has occurred or an input style for addresses is not specified.

If information to be inputted to a remarks column is not specified, the related arts described in PTL 1 and PTL 2 cannot cope with such information.

The present invention has been devised in view of such circumstances. An object of the present invention is to provide a data-pattern classification method and a classification system, by which columns containing information to be shared between databases can be easily found when the databases are combined.

Means for Solving the Problem

An aspect of the present invention is a data-pattern classification method for a database containing character strings regularly overlapping between the input values of mixed columns and information inputted in another specific column, the mixed column including types of information, the method including: extracting means for extracting a branch column for changing the type of information to be inputted to the mixed column, the branch column being extracted by one of a heuristic first technique and a second technique, the first technique using timing to change the pattern of the mixed column in the database including the mixed column, the pattern referring to a column where a character string overlaps the input value of the mixed column, the second technique using a statistical technique of a likelihood test; and classification to obtain the number of types of information stored in the mixed columns, by grouping, according to information indicated by the patterns, the patterns obtained from the mixed columns based on the extracted branch column.

Effects of the Invention

According to an aspect of the present invention, columns containing information to be shared between databases can be easily found when the databases are combined.

DESCRIPTION OF EMBODIMENTS

An embodiment of the present invention applied to a data-pattern classification method will be described below.
[Outline]
The outline of the present embodiment will be described below.

Columns in which types of information are inputted as in a remarks column in Table 1 are referred to as mixed columns in the present specification. A DB in the present embodiment is provided for character strings regularly overlapping between the input values of mixed columns and information inputted in another specific column. A combination of the input value of the mixed column and a column containing a character string overlap is referred to as a pattern.

If input values with identical patterns are simply handled as a group indicating the same information so that the input values of the remarks columns are grouped according to patterns obtained from the mixed columns, groups may be excessively generated.

In the present embodiment, patterns obtained from the mixed columns are grouped according to information indicated by the patterns. In the example of table 1, different patterns are obtained from the remarks columns of ID:1 and ID:2 but are classified as the same group because address information is inputted in both of the columns.

In the present embodiment, it is assumed that a branch column is present. Specifically, the branch column indicates a column for changing information about the input value of the remarks column according to an inputted character string. For example, in a DB containing a mixed column, like the classification column, if a character string X (e.g., "address") is inputted in a branch column as in a "classification" column, an input is made in the remarks column under a rule A (information about an address is inputted to the remarks column), whereas if another character string Y (e.g., "telephone") is inputted in the branch column, an input is made in the remarks column under a rule B (information about a telephone number is inputted to the remarks column). Thus, the type of an input value in the branch column is identical to the type of information in the mixed column.

For finding a branch column, two methods are used:
A) A heuristic method using the timing of a pattern change of the mixed column
B) A method using a statistical technique of a likelihood test The branch column is found as described above, so that patterns are grouped and the number of types of information stored in the mixed columns is determined. When the mixed columns are grouped, the mixed columns are classified by the type of information, facilitating a search for columns containing information to be shared between DBs when the DBs are combined.

Additionally, in combination with a technique of extracting a representative pattern from patterns belonging to one group, the order of superiority is determined among the patterns. This can unify input values according to the best pattern.

[Method Steps]

The specific steps of a data-pattern classification method will be described below.

It is assumed that a known column corresponds to a mixed column. Pieces of data stored in a DB is denoted as $d_i$ ($i \in \{1, 2, \ldots, n\}$) (n: the total number of pieces of stored data), and D denotes the data sets of mixed columns that are not blank.

For $d_i$, information about i-th data is listed except for mixed columns.

For example, in the DB of table 1, $d_i$=["A university", "Tokyo," "Minato Ward," "1-11-1," and "5678" ] is obtained.

At this point, $a_j$ denotes a mixed column corresponding to data $d_j$ that is an element of a set D.

Hereinafter, for character strings str1 and str2, a set of common characters is denoted as str1∩str2.

<Step 0> (Preprocessing: Pattern Extraction)

From among inputted information other than mixed columns, indexes including character strings shared with $a_j$ are all extracted. Specifically, an index x is found such that $a_j \cap d_j[x] \neq \varphi (x \neq y)$ is established. $\varphi$ indicates an empty set.

However, a search for the index x needs to satisfy all the following conditions i) to iii):

i) A common character string is as long as or longer than a half of the length of a character string $d_j[x]$.

If numbers or symbols (e.g., :, ;, −, +, @) are shared, the common character string requires a length of 2 or more, or $d_j[x]$ needs to include characters other than numbers and symbols.

ii) the common character string is identical to a character string obtained by deleting the first character from the character string $d_j[x]$ or deleting the last character from the character string. For example, in the case of $d_j[x]$ ="Fukushima Koriyama," the condition ii) is satisfied when a character string shared with $d_j[y]$ is "Fukushima" or "Koriyama," whereas "Fukuyama" does not satisfy the condition ii).

iii) Common character strings should not overlap one another among the elements of different indexes. For example, in the case of $a_j$="Fukushima Koriyama," the condition iii) is satisfied when $d_j[x]$="Fukushima" and $d_j[z]$ ="Koriyama" are obtained, whereas the condition iii) is not satisfied when $d_j[x]$="Fukushima" and $d_j[z]$="Fukushima Koriyama" are obtained.

If multiple indexes are extracted, a combination thereof is referred to as a pattern as described above. Patterns are extracted for all $d_j \in D$. The set of the patterns is denoted as P, and the i-th pattern is denoted as $p_i \in P$. An index is stored for each of the patterns. For example, $p_i$=[1, 4, 6] indicates a common part shared with character strings inputted in the first, fourth, sixth columns. By performing such preprocessing, the following processing steps for grouping can be efficiently performed.

First, technique A), the heuristic method will be described below.

<Step 1A>

The step 0 is performed to extract patterns.

<Step 2A>

The total number of the extracted patterns is denoted as |P|. Columns are selected according to the following two conditions:

(1) The number of types of character strings inputted to the columns is |P| or less.
(2) The columns do not contain any elements of the extracted patterns.

<Step 3A>

For each of the selected columns, the following value s is calculated: $s:=(error_c/c)+(error_f/f)$ (when vertically adjacent pieces of data are compared with each other, c:the number of times the input pattern of the mixed column changes, $error_c$:the number of times the input of the column is not changed even when the input pattern of the mixed column changes, f:the number of times the input pattern of the mixed column is kept, $error_f$:the number of times the input of the column changes even when the input pattern of the mixed column does not change.)

As the conditions of the branch column, the pattern of the mixed column may change concurrently with a change of an input character string, whereas the pattern may be unchanged when the character string does not change. Thus, the number of times the conditions are not satisfied and the ratio are indicated.

<Step 4A>

Columns are selected to obtain minimum s. The selected columns are denoted as $h_j (j \in \{1, 2, \ldots\})$, and a set of $h_j$ is denoted as H. At this point, the pattern of the mixed column is the data of $p_j$, and a character string with the highest frequency of occurrence is denoted as $m_i$ from among character strings inputted to $h_j$.

However, it is necessary to satisfy the condition "the number of times $m_i$ occurs exceeds a half of the number of data pieces in the pattern $p_i$." If the condition is not satisfied, $h_j$ is not assumed to be the branch column and is excluded from the set H.

If $m_i$ is determined for each pattern $p_i$ ($i \in \{1, 2, \ldots, |P|\}$), the column $h_j$ is assumed to serve as the branch column.

<Step 5A>

If the number of types of character strings inputted in the branch column $h_j$ is smaller than the total number |P| of patterns, the patterns are grouped. Specifically, patterns with the same $m_i$ are grouped as patterns indicating identical information. A representative pattern is selected from the grouped patterns.

A technique B), a statistical method according to a likelihood will be described below.

<Step 1B>

The step 0 is performed to extract patterns.

<Step 2B>

The total number of the extracted patterns is denoted as |P|. Columns are selected according to the following two conditions:

(1) The number of types of character strings inputted to the columns is |P| or less.
(2) The columns do not contain any elements of the extracted patterns.

<Step 3B>

A set of the selected columns is denoted as H. For each column $h_j$ of the set H, the pattern inputted in the mixed column $h_j$ is the data of $p_i$, and a character string with the highest frequency of occurrence is selected from among character strings inputted to $h_j$ and is denoted as $m_{ji}$. However, in the case of multiple candidates for $m_{ji}$, that is, multiple character strings having a mode, $h_j$ is not assumed to be the branch column and is excluded from the set H.

<Step 4B>

Regarding the column $h_j$ of the set H, a numeric value corresponding to each $x_{kl}$ of a two-dimensional tabulation in Table 3 is obtained, for each of $p_i$ and $m_{ji}$, from the data. $x_{kl}$: the number of pieces of data in which $m_{ji}$ is inputted in a pattern $p_k$.

However, in the presence of k and l ($k \neq l$, $k \neq i$, $l \neq i$) satisfying $m_{jk} = m_{ji}$ in the pattern $p_i$, $x_{ik} = x_{il} = M/2$ (M is the total number of pieces of data in which $m_{jk}$ (or $m_{jl}$) is inputted) is inputted to obtain equalization.

TABLE 3

|  | Pattern $p_i$ | Pattern $P_{j+1}$ | Total |
| --- | --- | --- | --- |
| ... |  |  |  |
| $m_{j(i+1)}$ input | $x_{ii}$ | $x_{(i+1)i}$ | $\sum_k x_{ki}$ |
| $m_{(j+i)}$ input | $x_{i(i+1)}$ | $x_{(i+1)(i+1)}$ | $\sum_k x_{k(i+1)}$ |
| ... |  |  |  |
| Total | $\sum_l x_{il}$ | $\sum_l x_{(i+1)l}$ | $\sum_l \sum_k x_{kl}$ |

By using a chi[$\chi$]-square test for the data, a hypothesis "Compliance with each pattern $p_i$ and the input of $m_{ji}$ accidentally occur at the same time" is tested. An expected frequency is indicated in table 4.

TABLE 4

|  | Pattern $p_i$ | 合計 |
| --- | --- | --- |
| ... |  |  |
| $m_{ji}$ input | $y_{ii} = \dfrac{\sum_k x_{ki} \sum_l x_{il}}{\sum_l \sum_k x_{kl}}$ | $\sum_k x_{ki}$ |
| ... |  |  |
| Total | $\sum_l x_{il}$ | $\sum_l \sum_k x_{kl}$ |

By the expected frequency table in table 4, a test statistic $\chi_i^2$ is determined according to the following expression:

$$\chi_i^2 = \sum_l \sum_k \frac{(x_{kl} - y_{kl})^2}{y_{kl}} \quad \text{[Math. 1]}$$

The foregoing operation is performed on each $h_j$.

The calculated test statistic $\chi_i^2$ is converted into a p value at a degree $(|P|-1)^2$ of freedom of a test amount. If the p value is larger than a significance level $\alpha$, the hypothesis is rejected and $h_i$ is outputted as the branch column. In the presence of multiple $h_i$, $h_i$ with a maximum p value is used as the branch column.

<Step 5B>

If the number of types of character strings inputted in the branch column $h_j$ is smaller than the total number $|P|$ of patterns, the patterns are grouped. Specifically, patterns with the same $m_i$ are grouped as patterns indicating identical information. A representative pattern is selected from the grouped patterns.

Example

A specific example based on the steps of the data-pattern classification method will be described below.

TABLE 5

| ID | School name | Prefecture | City, town and village | House number | Telephone number | Position | Classification | Remarks |
|---|---|---|---|---|---|---|---|---|
| 1 | A University | Tokyo | Minato-ward | 1-11-11 | 5678 | S | Address | 1-11-11, Minato-ward, Tokyo |
| 2 | B High school | Aichi | Nagoya | 2-22 | 6789 | S | Address | 2-22 Nagoya-city |
| 3 | C Technical College | Osaka | Osaka | 33-33-3 | 1234 | S | Telephone | 7890-1234 |
| 4 | D University | Kanagawa | Yokohama-city | 4-4-4 | 890 | S | Address | 4-4-4, Yokohama-city, Kanagawa |
| 5 | E university | Mie | Yokohama-city | 5-55-5 | 4567 | S | Address | 5-55-5, Mstsuzaka-city, Mie |
| 6 | F High school | Hyogo | Kobe-city | 66-6 | 9012 | R | Address | 66-6, Kobe-city, Hyogo |
| 7 | G High school | Saitama | Kawagoe-city | 7-77-7 | 234 | R | Telephone | 049-012-234 |
| 8 | H Junior high school | Gifu | Gifu-city | 888 | 123 | R | Telephone | 058-90-123 |
| 9 | I Junior high school | Kyoto | Kyoto-city | 9-99 | 3456 | R | Address | 8-99, Kyoto-city, Kyoto |
| 10 | J technical school | Chiba | Ichikawa-city | 00-000 | 789 | R | Address | 00-000, Chiba |

Table 5 indicates an example of a DB including input rules. In the remarks columns, one of (1) address and (2) telephone number is inputted. In the case of (1) address, information in columns "prefecture," "city, town and village," and "house number" is shared.

<Step 0>

Table 6 indicates extracted combinations of the columns including character strings shared with the remarks columns.

TABLE 6

| ID | Common column |
|---|---|
| 1 | Prefecture, city, town, village, house number |
| 2 | City, town and village, house number |
| 3 | Telephone number |
| 4 | Prefecture, city, town, village, house number |
| 5 | Prefecture, city, town, village, house number |
| 6 | Prefecture, city, town, village, house number |
| 7 | Telephone number |
| 8 | Telephone number |
| 9 | Prefecture, city, town, village, house number |
| 10 | Prefecture, house number |

In table 6, "ID" is not a common item because the common character corresponds to one digit of a number, which does not satisfy the condition i). Table 6 indicates four types of patterns as follows:

$p_1$=[prefecture, city, town and village, house number]
$p_2$=[telephone number]
$p_3$=[city, town and village, house number]
$p_4$=[prefecture, city, house number]

Technique A) Heuristic Method

<Step 1A>

The step 0 is performed to extract patterns.

<Step 2A>

Columns are selected so as to satisfy the following two conditions:

(1) The number of types of character strings inputted in the columns is four or less.

(2) The columns are not any elements of the extracted patterns.

The columns "position" and "classification" satisfy these conditions. The columns "ID" and "school name" each contain ten or more types of character strings and thus do not satisfy the condition (1).

<Step 3A>

For the column "position," the following is determined:
c=6 (the pattern changes when the ID changes from 1 to 2, from 2 to 3, from 3 to 4, from 6 to 7, from 8 to 9, and from 9 to 10) $error_c$=6 (the input character does not change at any one of the times)

f=3 (the pattern does not change when the ID changes from 4 to 5, from 5 to 6, and from 7 to 8)

$error_f$=1 (the pattern changes when the ID changes from 5 to 6)

Thus, s:=$(error_c/c)+(error_f/f)$=1+(1/3)≈1.333 is obtained.

For the column "classification," the following is determined:

c=6 (the pattern changes when the ID changes from 1 to 2, from 2 to 3, from 3 to 4, from 6 to 7, from 8 to 9, and from 9 to 10) $error_c$=2 (the input character does not change when the ID changes from 1 to 2 and from 9 to 10)

f=3 (the pattern does not change when the ID changes from 4 to 5, from 5 to 6, and from 7 to 8)

$error_f$=0 (the pattern does not change at the foregoing timing)

Thus, s:=$(error_c/c)+(error_f/f)$=(2/6)+0≈0.333 is obtained.

<Step 4A>

The value of s is small in the column "classification." At this point, the pattern of the remarks column is the data of $p_i$. From among character strings inputted to the column "classification," the following modes are obtained:

$p_1$:$m_1$=address (five times in five pieces of data)
$p_2$:$m_2$=telephone number (three times in three pieces of data)
$p_3$:$m_3$=address (one time in a piece of data)
$p_4$:$m_4$=address (one time in a piece of data)

Thus, four types of patterns are classified into $p_1$, $p_2$, $p_3$, and $p_4$.

<Step 5A>

The number of types of character strings inputted in the column "classification" is two, and thus the patterns are grouped into two types. In this case, the pattern that occurs most frequently in the data is regarded as a representative pattern, and the other patterns are regarded as patterns generated by erroneous inputs.

In the pattern of $m_i$="address," the occurrence frequency in the data is maximized in five times of the pattern $p_1$. Hence, the pattern $p_1$ serves as a representative pattern and is classified as a group assumed to be indicative of identical information.

A technique B), statistical method according to likelihood

<Step 1B>

The step 0 is performed to extract patterns.

<Step 2B>

Columns are selected so as to satisfy the following two conditions:

(1) The number of types of character strings inputted in the columns is four or less.
(2) The columns are not any elements of the extracted patterns.

The columns "position" and "classification" satisfy these conditions. The columns "ID" and "school name" each contain ten or more types of character strings and thus do not satisfy the condition (1).

<Step 3B>

$h_1$:"position" and $h_2$:"classification" are set. For the pattern $p_i$ (i=1, 2, 3, 4), $m_{ji}$ (j=1, 2) is set as indicated in table 7.

TABLE 7

|  | $p_1$ | $p_2$ | $p_3$ | $p_4$ |
|---|---|---|---|---|
| $h_1$ | $m_{11}$ = S | $m_{12}$ = R | $m_{13}$ = R | $m_{14}$ = S |
| $h_2$ | $m_{21}$ = Address | $m_{22}$ = Telephone | $m_{23}$ = Address | $m_{24}$ = Address |

<Step 4B>

For each column $h_j$, two-dimensional tabulations are created as indicated in table 8 and table 9.

TABLE 8

| $h_1$ |  | $p_1$ | $p_2$ | $p_3$ | $p_4$ | Total |
|---|---|---|---|---|---|---|
|  | $m_{11}$ | 3 | 1/2 | 0 | 0 | 7/2 |
|  | $m_{12}$ | 2 | 2 | 0 | 0 | 4 |
|  | $m_{13}$ | 0 | 0 | 1 | 0 | 1 |
|  | $m_{14}$ | 0 | 1/2 | 0 | 1 | 3/2 |
|  | Total | 5 | 3 | 1 | 1 | 10 |

In table 8, 1/2 is inputted at $m_{11}$:$p_2$ and $m_{14}$:$p_2$ because $m_{11}$ and $m_{14}$ are identical to each other with respect to a piece of data in which a character string S is inputted in the pattern $p_2$.

TABLE 9

| $h_2$ |  | $p_1$ | $p_2$ | $p_3$ | $p_4$ | Total |
|---|---|---|---|---|---|---|
|  | $m_{21}$ | 5 | 0 | 0 | 0 | 5 |
|  | $m_{22}$ | 0 | 3 | 0 | 0 | 3 |
|  | $m_{23}$ | 0 | 0 | 1 | 0 | 1 |
|  | $m_{24}$ | 0 | 0 | 0 | 1 | 1 |
|  | Total | 5 | 3 | 1 | 1 | 10 |

For each $h_j$, table 10 and table 11 of expected frequencies are created.

TABLE 10

| $h_1$ |  | $p_1$ | $p_2$ | $p_3$ | $p_4$ | Total |
|---|---|---|---|---|---|---|
|  | $m_{11}$ | 7/4 | 21/20 | 7/20 | 7/20 | 7/2 |
|  | $m_{12}$ | 2 | 6/5 | 2/5 | 2/5 | 4 |
|  | $m_{13}$ | 1/2 | 3/10 | 1/10 | 1/10 | 1 |
|  | $m_{14}$ | 3/4 | 9/20 | 3/20 | 3/20 | 3/2 |
|  | Total | 5 | 3 | 1 | 1 | 10 |

TABLE 11

| $h_2$ |  | $p_1$ | $p_2$ | $p_3$ | $p_4$ | Total |
|---|---|---|---|---|---|---|
|  | $m_{21}$ | 5/2 | 3/2 | 1/2 | 1/2 | 5 |
|  | $m_{22}$ | 3/2 | 9/10 | 3/10 | 3/10 | 3 |
|  | $m_{23}$ | 1/2 | 3/10 | 1/10 | 1/10 | 1 |
|  | $m_{24}$ | 1/2 | 3/10 | 1/10 | 1/10 | 1 |
|  | Total | 5 | 3 | 1 | 1 | 10 |

As indicated by table 8 and table 10, a chi-square test amount $\chi_1^2$ with respect to $h_1$ is $\chi_1^2 \approx 18.23$ As indicated by table 9 and table 11, a chi-square test amount $\chi_2^2$ with respect to $h_2$ is $\chi_2^2 = 31$ In this case, a significance level $\alpha=0.01$ is determined. Since an upper significance probability of 0.01 has a value of 21.7 at 9 degrees of freedom, a hypothesis is established at $h_1$ but is rejected at $h_2$, and $h_2$ serves as the branch column.

In the case of a small amount of sample data as in the present example, a Fisher test is more suitable than a chi-square test. In an actual application of the technique, however, it is assumed that the number of data pieces is sufficiently large and a chi-square test is used.

<Step 5B>

The number of types of character strings inputted in the column "classification" of $h_2$ is two, and thus the patterns are grouped into two types. In this case, the pattern that occurs most frequently in the data is regarded as a representative pattern, and the other patterns are regarded as patterns generated by erroneous inputs.

Specifically, in the pattern of $m_{2i}$="address," the occurrence frequency in the data is maximized in five times of the pattern $p_1$. Hence, the pattern $p_1$ serves as a representative pattern, and other patterns $p_3$ and $p_4$ are classified as a group assumed to be indicative of the same information as the pattern $p_1$.

By using the technique A) heuristic method and the technique B) statistical method according to likelihood, patterns obtained from the mixed columns can be grouped according to information indicated by the patterns.

[Effects of Embodiment]

According to the present embodiment specifically described above, columns containing information to be shared between databases can be easily found when the databases are combined.

The method of the present invention can be also implemented by a computer system in which a plurality of databases are combined. A program for implementing the method steps can be recorded in a recording medium or can be provided via a network.

Furthermore, the invention of the present application is not limited to the foregoing embodiment and can be changed in various ways within the scope of the invention in the implementation of the invention. Moreover, the embodiment includes inventions at various stages. Various inventions may be extracted with a proper combination of disclosed constituent components. For example, even if some of the constituent components are deleted from all the constituent components described in the embodiment, a configuration may be extracted as the invention without the deleted constituent components as long as the invention can solve the problem described in the technical problem and obtain the effects described in the effects of the invention.

The invention claimed is:

1. A data-pattern classification method for a database containing character strings regularly overlapping between input values of mixed columns and information inputted in another specific column, the mixed column including types of information, the method comprising:

extracting a branch column for changing a type of information to be inputted to the mixed column, the mixed column including two or more different types of information, the branch column being extracted by one of a heuristic first technique and a second technique, the first technique using timing to change a pattern of the mixed column in the database including the mixed column, the pattern referring to a column where a character string overlaps the input value of the mixed column, the second technique using a statistical technique of a likelihood test; and classifying to obtain the number of types of information stored in the mixed columns, by grouping, according to information indicated by the patterns, the patterns obtained from the mixed columns based on the extracted branch column, wherein the branch column indicates a column for changing information about the input value of a remarks column according to an inputted character string, wherein if a first character string is input in the branch column, making an input in the remarks column under a first rule; and wherein if a second character string is input in the branch column, making an input in the remarks column under a second rule.

2. The data-pattern classification method according to claim 1, further comprising, prior to the extraction, preprocessing for extracting all indexes of columns including character strings shared with the mixed columns.

3. The data-pattern classification method according to claim 1, wherein in the classification, a representative pattern is selected from the patterns belonging to one group, an order of superiority is determined among the patterns, and the patterns are grouped with the input values unified according to the representative pattern.

4. A data-pattern classification system for a database containing character strings regularly overlapping between input values of mixed columns and information inputted in another specific column, the mixed column including types of information, the system comprising:

one or more processors; and memory including code that, when executed by the one or more processors, perform to:

extract a branch column for changing a type of information to be inputted to the mixed column, the mixed column including two or more different types of information, the branch column being extracted by one of a heuristic first technique and a second technique, the first technique using timing to change a pattern of the mixed column in the database including the mixed column, the pattern referring to a column where a character string overlaps the input value of the mixed column, the second technique using a statistical technique of a likelihood test; and classify means for obtaining the number of types of information stored in the mixed columns, by grouping, according to information indicated by the patterns, the patterns obtained from the mixed columns based on the extracted branch column;

wherein the branch column indicates a column for changing information about the input value of a remarks column according to an inputted character string, if a first character string is input in the branch column, make an input in the remarks column under a first rule; and if a second character string is input in the branch column, make an input in the remarks column under a second rule.

5. The data-pattern classification system according to claim 4 wherein the code, when executed by the one or more processors, further performs to, prior to the extraction, preprocess for extracting all indexes of columns including character strings shared with the mixed columns.

6. The data-pattern classification system according to claim 4, wherein in the classification, a representative pattern is selected from the patterns belonging to one group, an order of superiority is determined among the patterns, and the patterns are grouped with the input values unified according to the representative pattern.

* * * * *